UNITED STATES PATENT OFFICE 2,295,545

TREATMENT OF METAL

Wilfred James Clifford and Henry Heward Adams, Brentford, England, assignors to Parker Rust Proof Company, Detroit, Mich., a corporation of Michigan No Drawing. Application February 2, 1939, Serial No. 254,238. In Great Britain February 4, 1938

4 Claims. (Cl. 148—6.5)

This invention relates to the treatment of metals, especially iron or steel, for instance to the treatment of metals with phosphate coating solutions in order to improve the resistance of the metals to corrosion or to provide a corrosion-resisting base for paints.

It is an object of the invention to accelerate the action of reagents which attack a metal surface.

It is a further object of the invention to accelerate the action of phosphate coating solutions, i. e., to reduce the time taken by the coating solution to form a complete coating, or to reduce the temperature, or to obtain a better coating in a given time under given conditions than if the compound were not present.

Where phosphate and similar coatings are being employed, they may be applied to the metal in any suitable manner, for instance by spraying, brushing, flowing or immersion methods.

It has now been found that the action of phosphate coating solutions, can be accelerated by incorporating therein a minor amount of an accelerating compound containing a non-ionic nitro group.

Certain of the accelerating compounds of the invention are liable to become decomposed in the course of the coating or other reaction with the production of decelerating compounds. Such is the case with nitrobenzene, for instance, which is liable to be reduced by the hydrogen liberated in the process with the production of aniline, a decelerating compound on account of the presence of the ortho-para-directing amino group. This is theoretically a disadvantage with all nitro groups, which tend to reduce to amino groups. If the accumulation of the decelerating compound becomes serious, the disadvantage can sometimes be overcome by incorporating a nitrate in the coating solution or other reagent. In some cases the nitrate is reduced to nitrite and the nitrite reacts with the amine to form a volatile hydroxy-compound which escapes from the solution. In some cases, again, the reduction products of the nitro compound are not deleterious. Thus nitroguanidine on reduction yields ammonia and carbon dioxide, and nitromethane yields methylamine, which for some reason has little or no decelerating effect.

Examples of the accelerating compounds defined in the preceding paragraphs are nitromethane, nitrobenzene, o-, m- and p-nitrophenols, o-, m- and p-nitranilines, o-, m- and p-nitrobenzoic acids and picric acid, in which the accelerating group is the nitro group.

In general, indeed, any accelerating compound may if desired be introduced into the coating solution or other reagent by the addition of a substance which decomposes or reacts in the solution with the formation of the desired accelerating compound.

In the compounds defined above containing a hydrocarbon residue, substituted or unsubstituted, and an accelerating group the group is attached directly to the residue. It has been found that compounds in which the accelerating group is attached to the residue not directly but through the agency of a single nitrogen atom have an accelerating effect also, and the above remarks on the presence of decelerating groups apply here also. In general the structure of these accelerating compounds will be of the type R.NH.X, where R is the substituted or unsubstituted hydrocarbon residue and X is a nitro group, although the hydrogen atom attached to the nitrogen may itself be substituted, for instance by a methyl or other alkyl group. Examples of the accelerating compounds referred to in this paragraph are nitrourea

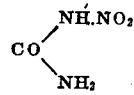

in which the accelerating group is the nitro group and the hydrocarbon residue $CH_3$— contains as substituents an oxygen atom and an amino group, nitroguanidine

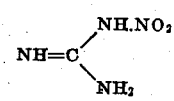

which is a similar compound in which an NH= group is present instead of the oxygen atom, and nitrourethane $C_2H_5OOC.NH.NO_2$.

The optimum concentration of the accelerating compound in the reagent attacking the metal surface differs with different compounds, but in the case of phosphate coating solutions is in general from about 0.01% to 0.4% by weight of the solution. Too much or too little of the accelerating compound may be detrimental to good results. Furthermore, even at optimum concentrations all compounds do not give the same accelerating effect. It appears probable in many cases that with a given accelerating group the smaller the molecule the more efficient the accelerating action at optimum concentration, while in the case of decelerating groups the smaller the molecule the less the decelerating action, but this is by no means certain. The optimum concentrations and efficiencies at optimum concentration of various compounds which may be employed according to the invention are given in the following table, the results being arrived at by adding the compound to a solution of zinc dihydrogen phosphate having a normality of $$\frac{N}{20}$$

free acid (determined by titrating with the aid of methyl orange indicator) and $$\frac{N}{5}$$

total acid (determined by titrating with the aid of phenol-phthalein indicator) and treating a cleaned steel sheet for 2 minutes at 80° C. The cleaned steel sheet referred to here and in the examples given below is a steel sheet in its original bright rolled condition rendered substantially free from grease by wiping with clean white spirit.

| Substance | Optimum concentration | Efficiency |
|---|---|---|
| | Percent | |
| Picric acid | 0.1 | Very good. |
| Nitroguanidine | 0.2 | Do. |
| Nitrobenzene | 0.1 | Good. |
| Nitromethane | 0.1 | Do. |
| Nitrourethane | 0.2 | Do. |
| o-Nitraniline | 0.05 | Do. |
| m- or p-Nitraniline | 0.04 | Do. |
| m- or p-Nitrophenol | 0.04 | Do. |
| Nitrourea | 0.4 | Slight acceleration. |
| m-Nitrobenzoic acid | 0.1 | Do. |
| o-Nitrophenol | 0.1 | Do. |

While the compounds of the invention may be the only accelerators present in a coating bath, they may also be employed in conjunction with other accelerators, for instance metallic accelerators such as copper compounds or oxidising agents such as nitrates or nitrites. The presence of copper ions appears to promote heavier and darker coatings, and the presence of a nitrate such as zinc nitrate appears to give a slight further acceleration. It should be added here that the normal formula for nitrous acid is H—O—N=O in which hydrogen is attached to the nitrite group —O—N=O, and this does not fall within the definitions of accelerating compounds given earlier in this specification. However, as the formula of nitrous acid may be represented as

i. e. as including a nitro group, we wish to make it clear that we do not include in the claims the use of nitrous acid as the said accelerating compound, although nitrous acid may be present in addition to the said compound, as will be clear from the above reference to the use of nitrites in addition to the accelerating compounds of the invention.

Certain of the accelerating compounds of the invention are so effective that coatings can be produced from phosphate solutions containing them in the cold, as is the case with nitroguanidine.

The invention is illustrated by the following examples:

*Example 1*

This is an example of the use of nitroguanidine to accelerate a coating operation to so great an extent that it can be effected in the cold.

A cold solution of manganese phosphate having a normality of about $$\frac{N}{100}$$

free acid (determined by titrating with the aid of methyl orange indicator) and $$\frac{N}{5}$$

total acid (determined by titrating with the aid of phenol-phthalein indicator) will not produce a coating on a cleaned steel sheet in an hour. The addition of 0.3% of nitroguanidine to such a solution enables a coating to be obtained in 10 minutes.

*Example 2*

This is an example of the use of nitroguanidine in a hot solution.

A zinc dihydrogen phosphate solution with normality of about $$\frac{N}{20}$$

free acid (determined by titrating with the aid of methyl orange indicator) and $$\frac{N}{5}$$

total acid (determined by titrating with the aid of phenol-phthalein indicator), to which 0.2% of nitroguanidine has been added, will at 80° C. produce an adherent coating on a cleaned steel sheet in two minutes. In the absence of the nitroguanidine only a soft non-adherent coating is produced in 10 minutes.

*Example 3*

A cleaned steel sheet can be successfully coated with a phosphate coating by treating it at a temperature from 15 to 80° C. with a solution of zinc or manganese dihydrogen phosphate, of concentration $$\frac{N}{5}$$

when determined using phenol-phthalein as indicator, containing 0.05% of nitroguanidine.

If in any of the above examples 0.001% of copper (calculated as the metal) is added to the solution, for instance in the form of the nitrate or carbonate, a darker and slightly heavier coating is obtained, and the addition of zinc nitrate results in a slight further acceleration.

We claim:
1. A process for improving the resistance of ferrous metals to corrosion, which comprises treating a ferrous metal with a phosphate coating solution in which the coating action is accelerated by the presence of a minor amount of an organic accelerating compound containing a non-ionic nitro group.

2. A process for improving the resistance of steel to corrosion, which comprises treating the steel with a phosphate coating solution in which the coating action is accelerated by the presence of a minor amount of nitrobenzene.

3. A process for improving the resistance of steel to corrosion, which comprises treating the steel with a phosphate coating solution in which the coating action is accelerated by the presence of a minor amount of picric acid.

4. A process for improving the resistance of steel to corrosion, which comprises treating the steel with a phosphate coating solution in which the coating action is accelerated by the presence of a minor amount of nitrophenol.

WILFRED JAMES CLIFFORD.
HENRY HEWARD ADAMS.